G. H. FRASER.
DUST FILTER AND THE LIKE.
APPLICATION FILED APR. 20, 1915.

1,259,008.

Patented Mar. 12, 1918.

WITNESSES:
Sigvard G. Hellum
Gustav Schonheit

INVENTOR
George Holt Fraser

UNITED STATES PATENT OFFICE.

GEORGE HOLT FRASER, OF BROOKLYN, NEW YORK.

DUST-FILTER AND THE LIKE.

1,259,008.

Specification of Letters Patent.

Patented Mar. 12, 1918.

Application filed April 20, 1915. Serial No. 22,645.

*To all whom it may concern:*

Be it known that I, GEORGE HOLT FRASER, a citizen of the United States, residing in the borough of Brooklyn, county of Kings, city and State of New York, have invented certain new and useful Improvements in Dust-Filters and the like, of which the following is a specification.

This invention relates to means for removing solids from fluids, such as air filters for extracting dust from air, gas washers for removing solids from the outflowing gases of gas producers, collectors for extracting the finely divided ores in suspension in flue gases, or filters for clarifying liquids carrying floating matter, and aims to provide improvements in such devices especially applicable to air or gas filters.

In apparatus of this class it is common to interpose between influent and effluent passages a cloth or other filter medium pervious to fluid for extracting the solids from the current traversing it.

One form of such filters comprises an inlet chamber, an exhaust chamber, one or more bags in the exhaust chamber and communicating with the inlet chamber, so that the current entering the latter rises within the bags and escapes through them, and means for agitating the bags to dislodge accumulated material thereon. A valve for arresting the current while cleaning the bags is employed.

My invention aims to provide improved means for cleaning the filters, means for automatically agitating them, and means for increasing their efficiency.

To this end in carrying out the preferred form of my present improvements as applied to air filters, I provide means for producing a reverse current through the filtering medium automatically and periodically, means for agitating the filter when clogged, improved valves and connections, improved operating means, and various other features of improvement all of which will be hereinafter more fully set forth.

Figure 1:
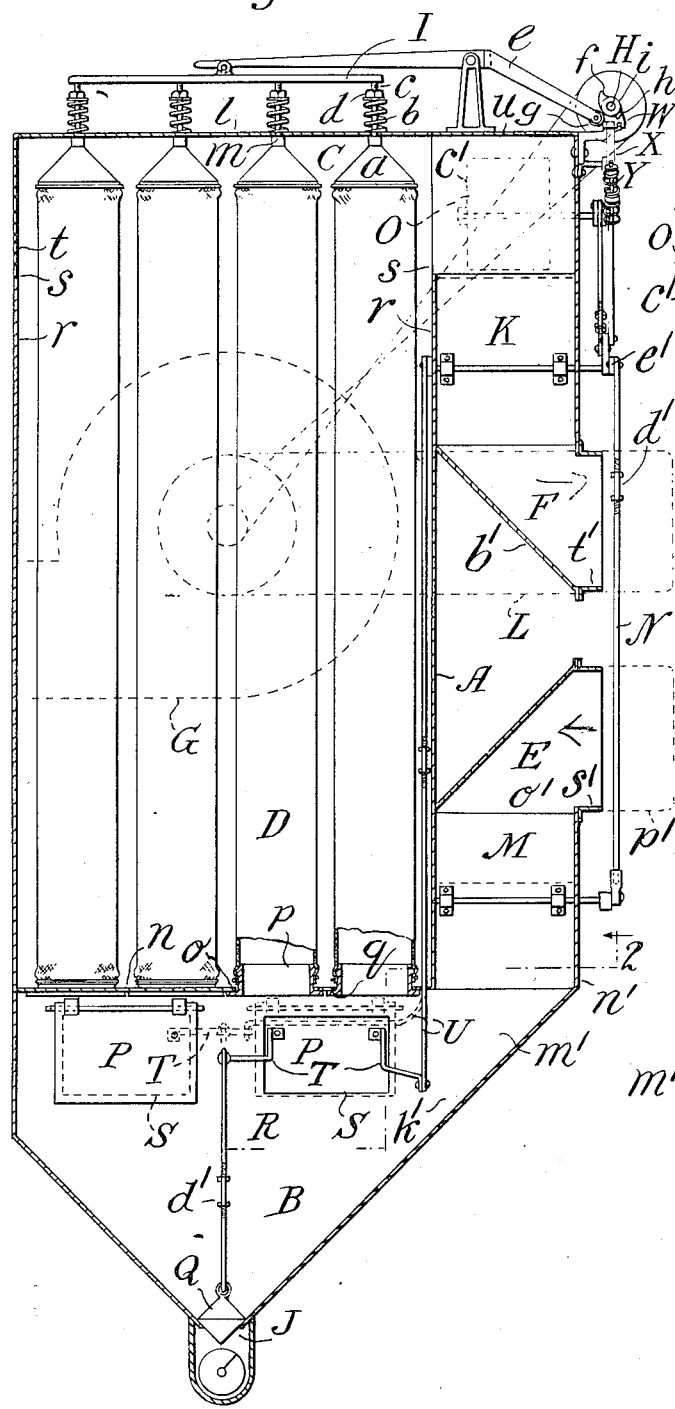
Figure 2:
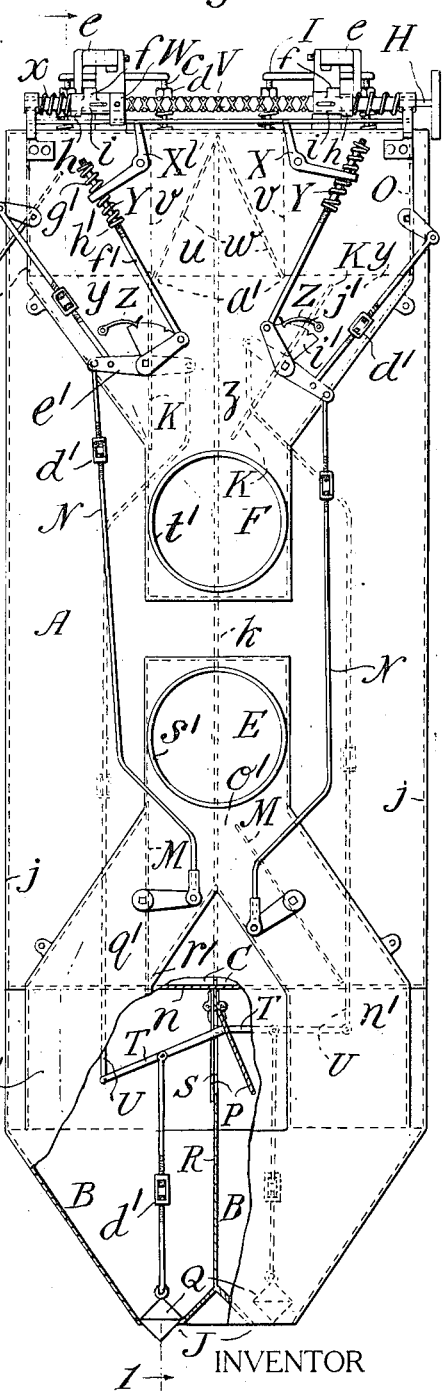

In the accompanying drawings which show the preferred form of my improvements as applied to an air filter, Figure 1 is a vertical cross section partly in side elevation, cut on the line 1—1 of Fig. 2, and Fig. 2 is a front elevation partly in vertical longitudinal section cut on the line 2—2, of Fig. 1.

Referring to the drawings, let A indicate the main frame or casing of an air filter, B the dust or inlet chamber thereof, C the suction or exhaust chamber thereof, D the filter cloths or bags, E the inlet pipe or conduit, F the outlet or suction pipe, which is connected to a blower G or other means for causing a current to flow through the filter, H the driving or operating mechanism, I the jarring or cleaning mechanism.

These parts may be of any usual or suitable construction which will permit air drawn through the intake E to rise from the dust chamber B within the tubes D and escape through these to the exhaust chamber C and pass from the latter through the outlet F and blower G. The dust extracted by the filters falls in the chamber B and flows through the outlet J. The driving shaft H closes the valve K in the outlet to arrest the current, and then operates the jarring mechanism to clean the tubes. The inlet and exhaust chambers are usually duplicated and each has its own group of filter bags, so that the chambers may be shut off and cleaned alternately without completely stopping the flow through the inlet and exhaust pipes, and these duplicate units are multiplied to suit the volume of air to be handled, and all the exhaust pipes are connected by common suction main L to the blower when more than one unit is used, the inlet pipes E being connected to a common main p' for their multiple branches when these are employed.

According to one feature of my present improvements I provide the cut-off valve K on the outlet passage and a companion gate or valve M in the inlet passage for each filter compartment, connecting these valves together to act in unison by a rod or other suitable connection N, so that they will open and close together, and preferably making each as a butterfly valve which will be practically balanced and afford the least resistance to operation, and I automatically and periodically operate these valves so that at moments when they are closed the filter bags and their compartments will be completely isolated from the normal current, permitting them to sag and collapse and relieve themselves of accumulated dust.

According to another feature of improvement I provide means for producing a reverse current through the filter bags throwing back through them any solids lodged in their interstices. This is preferably accomplished by providing a relief valve O, opening to the outer air, in the suction chamber C, and an exhaust valve P in the inlet chamber B, and connecting these together to operate simultaneously to permit ingress of clean air to the suction chamber and egress of air from the dust chamber into the adjoining dust chamber, so that the suction in the latter will draw the clean air reversely over the filter bags and blow out from them any solids lodged in their interstices, and the dust thus cleaned out of them will fall into their dust chamber or flow into the adjoining one where it will be arrested by the pervious filter tubes of the latter.

According to one feature of improvement I operate these valves simultaneously with the main shut off valves K and M so that the reversing valves will immediately open and close thus making an instantaneous and complete reversal at each operation of these valves, and I operate them automatically, periodically, and preferably mechanically. To prevent the entrance of air and to close the dust chamber B while the current is reversed my invention provides an automatic valve Q connected to the valve P and closing as the latter opens so that the dust outlet is closed and the suction may be effected to flow through valve P drawing in the fresh air through the tubes from the valve O. As shown each valve P is provided on the reverse side of a partition R between the two dust chambers B which partition has valve openings S through which the arms T of the valves work, and these arms are connected by rods or other connections U with their valves K respectively so as to be operated with the operation of the other valves. The valve Q of each dust chamber is opened as its reverse valve is closed, and closes as its reverse valve opens.

All or any of these valves can be operated at any time and in any manner for cleaning the bags when they become clogged, but I prefer to operate the valves periodically, those for one set intermediate of the operation of those for the other set, and each momentarily, so that between cleaning operations both groups may be used in filtering, and at all times one group will be used, thus avoiding complete interruption of current.

Any suitable automatic means may be employed, but I prefer the means shown which comprise a double screw V on the driving shaft H and a reversing traveler W operated by this screw which alternately operates first one series of valves and then the other as it travels and thus automatically cleans one compartment and then a companion compartment at predetermined intervals.

To secure quick action from full open to full closed positions for the valves I provide lost motion means preferably comprising a lever and a power storing or spring connection Y, the lever being tilted by the traveler until it compresses the spring sufficiently to overcome the resistance of the snap spring Z and lift this out of its locking notch in the valve K, whereupon the tension of the spring will suddenly shift the valve until the catch Z engages the other notch and locks the valve in the corresponding position. As the traveler passes the lever X the latter will be thrown in to the path of the traveler at its rear so that as the traveler reverses it will again shift the lever and reset the valves. Any suitable quick acting or lost motion device may be used, but I prefer the mechanism shown when the valves are operated periodically.

To jar the filters I provide impact strikers or hammers I which strike on the tops of the filter caps $a$ against the tension of springs $b$ surrounding the screw-threaded rods $c$ thereof and adjusted by nuts $d$ thereon so that the bags are held under tension and quickly restored after the impact of the hammers on their pins. The hammers are operated by a lever $e$ and cam $f$ which is automatically slid into engagement with the roller $g$ of the lever as the traveler W closes the valves, and passes out of such engagement before it again opens the valves, so that the agitation takes place while the tubes are relaxed and the current is reversed.

When the tubes are not overweighted with dust their springs will hold the hammers high enough to keep the roll $g$ out of contact with the small cam $h$ on the sliding cam wheel $i$, but should the bags become sufficiently heavy to depress their springs enough the lever $e$ will tilt until its roll $g$ enters the path of this cam $h$ whereupon it will be acted on thereby and the hammers will be automatically operated while the filter is in normal operation. As soon as the bags are cleaned by this jarring their springs will throw their lever out of engagement with the auxiliary cam and vibration will discontinue until they again automatically start it or until the traveler automatically moves the large cam $f$ into action.

The companion suction compartments preferably have a common passage communicating with their respective valves and with the main or conduit with which they are in communication, and the dust chambers make discharge into a common outlet.

In operation the drive shaft will be operated by a belt from the blower or blowers, speeded to suit the desired frequency of cleaning and jarring actions, and the apparatus will be ready for continuous automatic operation. Any compartment can be operated by hand at any time to throw it in or out of the work, and manual jarring can be applied to any group of tubes. The elastic tension under which the tubes are maintained will prevent complete collapse during reverse flow, and insure quick return after impactive jarring.

It will be seen that my invention provides improvements which can be readily and advantageously availed of in whole or in part and it will be understood that the invention is not limited to the particular details of construction, arrangement or combination of features set forth as constituting its preferred form, since it can be employed in whole or in part according to such modifications of these as circumstances or the judgment of those skilled in the art may dictate without departing from the spirit of the invention.

In detail the construction shown as the preferred form of my invention comprises a rectangular vertical casing having long imperforate side walls $j$ and a central imperforate partition $k$ dividing its interior to form the two suction chambers C, which are closed at the top by a top wall $l$ having a small aperture $m$ opposite each tube for guiding the stem $c$ of the cap $a$ of each, and closed at the bottom by a wall $n$ having large holes $o$ opposite each tube and through which the tubes can be passed and in which their lower tubular thimbles $p$ loosely play and are held against the tension of the springs by their flanges $q$ which embrace the under side of the wall so that when the tubes are slack their thimbles can rattle and descend in these holes and when they are jerked up their flanges will suddenly arrest the tubes and cause a jerking action or jolt assisting in cleaning them. The front and rear walls $r$ of the casing are short and afford apertures $s$ at their upper ends, one of which is closed by a door $t$ in rear and the other of which communicates with the effluent hood $u$, which has outlet openings $v$ matching the corresponding opening $s$ through which the air may flow outwardly to the conduits $y$. The hood and the cover $t$ are adapted to be connected to the front and rear of the casing.

The hood $u$ has a central partition $w$ dividing it into two outlet conduits $y$, one for each chamber C, the outer walls of which slope downwardly and inwardly so that the conduits merge into a common conduit $z$. The valves are balanced or butterfly valves parallel with outer walls of the conduits $y$ when open and closing to a vertical position against the seats $a'$ therein when closed. The bottom wall $b'$ of the conduit $z$ is inclined outwardly toward the main L to which the conduit is separably connected.

The air valves O close openings $c'$ in the side walls of the hood $u$, and are shown as butterfly, but of course may be otherwise placed and of ventilator or other construction.

The driving and agitating mechanism is carried on the separable hood $u$ so as to be shifted therewith in case it is reversed.

Adjustable or other links $d'$ connect the various valves by engaging handles, levers or arms $e'$ thereon. The operating links $f'$ between the valves K and their levers X are adjustably connected to the latter to provide suitable yield and lost motion as by the springs $g'$ and nuts $h'$.

The trip or snap switch Z for insuring quick action and position of the valve is preferably a notched sector $i'$ on the valve stem and a leaf spring $j'$ on the hood.

The dust chambers D are preferably separated by a vertical wall R through which openings S are formed for the relief valves P, and the dust chambers are preferably separably mounted on the bottom of the casing so that they can be reversed thereon. They have inlets $k'$ communicating with the inclined conduits $m'$ of the influent hood $n'$, which preferably is a bifurcated member having a central conduit $o'$ communicating with the common suction main $p'$ and dividing into right and left inlet conduits $q'$ controlled respectively by the valves M, which are balanced butterfly valves arranged to stand in line with their conduits when opened and vertically when closed and then engaging seats $r'$ in the latter.

When arranged as shown the inlet and outlet necks $s'$ and $t'$ being both on the same side are convenient to the arrangement of inlet and outlet mains close together, and directing the inlet and outlet conduits toward one another attains great compactness.

What I claim is:

1. In combination, a casing comprising inlet and outlet passages, a pervious filter member in said casing through which current between said passages must pass, means for creating current in one direction through said casing, closure means in advance of and succeeding said member mechanically operated for isolating said casing from such current, and means for causing a reverse suction current to flow through said casing and through said member.

2. In combination, a casing comprising a closed chamber, having inlet and outlet passages, a pervious filter member mounted in said casing and controlling flow of current between said passages, automatically operated valves for closing said inlet and outlet passages, an automatically operated relief valve opening to said chamber when said valves are closed, and means for causing a reverse suction current to flow through said member.

3. In combination, a casing comprising a closed chamber and inlet and outlet passages, a pervious filter member controlling flow of current through said chamber, valves in advance of and succeeding said member mechanically operated for closing said passages, and an exhaust suction valve at the ingress side of said filter for causing a reverse flow therethrough.

4. In combination, a casing comprising a chamber having inlet and outlet passages, a pervious filter member controlling flow of current through said chamber, yielding means supporting said member, and jarring mechanism controlled by said yielding means and operating when the latter yield under the weight of said filter member to jar the latter.

5. In combination, a casing comprising a closed chamber having inlet and outlet conduits, a pervious filter member controlling flow of current through said casing, balanced butterfly valves for said conduits, means affording downwardly extending seats for said valves, and means automatically operating said valves simultaneously.

6. In combination, a casing comprising a chamber having inlet and outlet conduits, an intermediate pervious filter member dividing said casing, means arresting current through said casing, and quick acting automatic means operating said arresting means, comprising a power storing device movable relatively to said arresting means, and a lost motion connection between the latter and said arresting means.

7. In combination, a casing comprising a chamber having inlet and outlet passages, a pervious filter intermediate of and controlling flow between said passages, closure means for one of said passages, yielding means operating said closure means, and comprising a yielding member for operating and movable independently of the latter and means automatically operating said yielding means.

8. In combination, a casing comprising a closed chamber and inlet and outlet conduits leading thereto, means for extracting solids from the current through said casing intermediate of said conduits, mechanically operated passive balanced valves swinging on horizontally extending axes for controlling flow through said conduits in advance of and succeeding said means, means affording downwardly extending seating faces for said valves, and automatic means operating said valves.

9. In combination, a casing comprising a closed chamber and inlet and outlet passages, communicating the one with the upper and the other with the lower parts thereof respectively, exhaust and inlet conduits communicating respectively with said passages and respectively extending upwardly and downwardly toward each other and having adjacent ends intermediate of said parts, a filter member within said casing, a valve for one of said passages and reversible power driven mechanism operating said valve.

10. In combination, a casing comprising a closed chamber and inlet and outlet passages, a non-rotary pervious filter member partitioning such chamber, automatically yielding means carrying said member and operated by the weight thereof, and cleaning means controlled by the position of said filter member, and mechanical means operating said cleaning means when said filter member becomes clogged.

11. In combination, a casing comprising a suction chamber, a dust chamber, an inlet to the latter and a suction pipe from the former, a pervious filter between said suction and dust chambers, a valve for said dust chamber, a valve for such suction pipe, a relief valve, and means for closing said suction and dust valves simultaneously opening said relief valve comprising a power storing device movable independently of said valves and acting to quickly operate the latter.

12. In combination, a casing comprising a chamber having inlet and outlet passages, a filter member between said passages, a valve controlling flow through said casing, and means operating said valve comprising a double screw, a reversing traveler operated thereby, and a power storing device operated by said traveler and movable independently of said valve for quickly operating the latter.

13. In combination, a casing having inlet and outlet passages, a filter member in said casing between said passages, means for jarring said member, a screw threaded revolving shaft, and an axially movable revolving cam or tappet movable axially from said screw thread slidingly mounted and operating said means.

14. In combination, a plurality of casings each comprising a suction chamber comprising a segregable part of a current conduit and each having an inlet and outlet passage, filter members in said chambers respectively, common means causing a current to flow through said chambers, valves in advance of and succeeding said chambers for isolating the respective chambers from said current, and valves in advance of said chambers, for reversely connecting said chambers respectively with said current to cause a reverse flow through said filter members for cleaning the latter.

15. In combination, a plurality of closed chambers, each comprising a segregable part of a current conduit and each having an inlet and outlet passage, a pervious filter member controlling flow through said chambers respectively, a common exhaust for said chambers, an exhaust valve for each chamber, a common intake for said chambers, an intake valve for each chamber, a connecting passage between two of said chambers at the ingress side of said filter, a connecting valve for said connecting passage normally closed for separating said chambers and opening for causing a reverse current through said member, means for closing said exhaust valve and intake valve of one of said chambers to segregate it from said conduit, and means for then opening said connecting valve, and means for operating said valves.

16. In combination, a casing comprising a suction chamber having two compartments, an effluent head having a common outlet and having at each side of said outlet conduits communicating with said compartments respectively, and separate valves between said outlet and said conduits respectively controlling said conduits respectively.

17. In combination, a casing having a suction chamber and two dust chambers, an influent head in communication with said dust chambers and having a common inlet conduit and having at each side of said inlet separate conduits communicating between the latter and said chambers respectively and separate valves between said inlet and conduits respectively controlling said separate conduits respectively.

18. In combination, a casing comprising walls inclosing a suction chamber and having similarly disposed substantially identical front and rear apertures, a removable effluent hood removably mounted on said casing and closing one of said apertures, and removable means closing the other of said apertures.

19. In combination, a non-rotary pervious vertically movable filter member movably supported, and downwardly active impactive jarring means for cleaning said member controlled by the vertical movement thereof.

20. In combination, a pervious filter member, and means for cleaning said member controlled by the weight thereof.

21. In combination, current cleaning means, a jarring mechanism therefor, a revolving cam or tappet for operating the latter, revolving means for operating said cam or tappet, and yielding means movable axially of said revolving means for controlling operation of said cam or tappet on said jarring mechanism.

22. In combination, a casing having dust extracting provisions, means for creating a current therein, and means for cleaning said provisions, comprising a jarring mechanism and revolving means for operating the latter, said latter parts movable the one relatively to the other into normally operative and normally inoperative positions, and said revolving means having provisions for acting on said jarring mechanism in either of said positions.

23. In combination, a casing having dust extracting provisions and an inclined current conduit affording an upwardly and downwardly extending seating surface, and means for producing a current therethrough, and a swing valve within the inclined portion of said conduit closing against said surface for controlling said current.

24. In combination, a casing comprising a chamber and an upwardly and downwardly extending current conduit communicating therewith having an upwardly and downwardly extending seating face and affording a lower recess or space below said face, and a butterfly valve for said conduit mounted therein on an axis transverse of the longitudinal extension of said conduit having upwardly and downwardly extending faces engaging said seating faces for closing said conduit to control current through said chamber and having an edge swinging open in said recess or space to permit precipitated matter to descend therein.

25. In combination, a casing comprising a suction chamber having an apertured bottom, a tubular pervious filter member mounted in said casing, having an annular open bottomed member extending through and loosely seated in the aperture in said bottom, and having an outwardly projecting flange or portion beneath and engaging said bottom for holding said filter member down, means exerting an upward stress on said filter member, and means for relaxing such stress.

In witness whereof, I have hereunto signed my name in the presence of two subscribing witnesses.

GEORGE HOLT FRASER.

Witnesses:
 GUSTAV SCHONHEIT,
 SIGVARD G. HELLEM.